US012578056B2

(12) United States Patent
Grove

(10) Patent No.: US 12,578,056 B2
(45) Date of Patent: Mar. 17, 2026

(54) FAN FOR LUBRICATION AND COOLING OF ECCENTRIC BEARINGS IN A SURFACE COMPACTOR MACHINE

(71) Applicant: Volvo Construction Equipment AB, Eskilstuna (SE)

(72) Inventor: Christopher Grove, Fayetteville, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 1535 days.

(21) Appl. No.: 16/980,414

(22) PCT Filed: Mar. 15, 2018

(86) PCT No.: PCT/US2018/022651
§ 371 (c)(1),
(2) Date: Sep. 13, 2020

(87) PCT Pub. No.: WO2019/177610
PCT Pub. Date: Sep. 19, 2019

(65) Prior Publication Data
US 2021/0003248 A1 Jan. 7, 2021

(51) Int. Cl.
*F16N 7/36* (2006.01)
*B06B 1/16* (2006.01)
(Continued)

(52) U.S. Cl.
CPC ............... *F16N 7/36* (2013.01); *B06B 1/167* (2013.01); *F16C 3/18* (2013.01); *F16C 33/6637* (2013.01);
(Continued)

(58) Field of Classification Search
CPC .... F16C 3/18; F16C 33/6666; F16C 33/6637; F16C 33/6681; B06B 1/16; B06B 1/167;
(Continued)

(56) References Cited

U.S. PATENT DOCUMENTS 2,677,995 A * 5/1954 Wood .................... E01C 19/281
404/117
3,052,166 A * 9/1962 Thrun ..................... F16C 27/04
384/535
(Continued)

FOREIGN PATENT DOCUMENTS

CN        101649595 A        2/2010
CN        202047346 U        11/2011
(Continued)

OTHER PUBLICATIONS

International Search Report and Written Opinion of the International Searching Authority, PCT/US2018/022651, mailed Jun. 8, 2013, 6 pages.
(Continued)

*Primary Examiner* — Minh Truong
(74) *Attorney, Agent, or Firm* — Sage Patent Group

(57) ABSTRACT

An eccentric shaft assembly includes a first eccentric shaft including an interior surface forming a recess therein, an exterior surface, at least one first fluid inlet extending between the interior surface and the exterior surface, at least one first fluid outlet extending between the interior surface and the exterior surface. The eccentric shaft assembly further includes a second eccentric shaft disposed in the recess of the first eccentric shaft that includes a second bearing surface engaging the first bearing subassembly opposite the first bearing surface and at least one first fan blade for rotating about an axis of rotation to force a fluid to enter the recess through the first fluid inlet(s) and exit the recess through the first fluid outlet(s), to lubricate and/or cool a bearing subassembly disposed between the first eccentric shaft and the second eccentric shaft.

15 Claims, 5 Drawing Sheets

(51) Int. Cl.

| | |
|---|---|
| *F16C 3/18* | (2006.01) |
| *F16C 33/66* | (2006.01) |
| *F16N 1/00* | (2006.01) |
| *F16N 7/26* | (2006.01) |
| *E01C 19/28* | (2006.01) |

(52) U.S. Cl.

CPC ................. *F16N 1/00* (2013.01); *F16N 7/26* (2013.01); *E01C 19/286* (2013.01)

(58) Field of Classification Search

CPC . E01C 19/286; F16N 1/00; F16N 7/26; F16N 7/36

USPC ......................................................... 404/117

See application file for complete search history.

(56) References Cited

U.S. PATENT DOCUMENTS

| | | | | |
|---|---|---|---|---|
| 3,257,918 A | * | 6/1966 | Garis | .................... E01C 19/281 |
| | | | | 404/117 |
| 3,721,129 A | | 3/1973 | Wallick | |
| 3,903,992 A | * | 9/1975 | Chivukula | .............. F16C 35/04 |
| | | | | 384/373 |
| 4,353,261 A | * | 10/1982 | Salani | ..................... B06B 1/161 |
| | | | | 74/61 |
| 4,474,275 A | * | 10/1984 | Staedeli | .................. F16D 23/10 |
| | | | | 192/113.32 |
| 4,749,305 A | | 6/1988 | Brown et al. | |
| 5,220,845 A | | 6/1993 | Anderson | |
| 6,454,051 B1 | | 9/2002 | Okayasu | |
| 7,066,681 B2 | | 6/2006 | Paske | |
| 8,393,826 B1 | * | 3/2013 | Marsolek | .............. E01C 19/286 |
| | | | | 74/61 |
| 8,967,910 B2 | | 3/2015 | Hansen et al. | |
| 9,334,621 B2 | * | 5/2016 | Persson | .................... F16C 3/18 |
| 2004/0120767 A1 | | 6/2004 | Potts et al. | |
| 2011/0158745 A1 | | 6/2011 | Oetken et al. | |
| 2013/0000429 A1 | | 1/2013 | Marsolek et al. | |
| 2017/0014867 A1 | | 1/2017 | Smith et al. | |
| 2020/0354902 A1 | * | 11/2020 | Macdonald | .............. B06B 1/16 |

FOREIGN PATENT DOCUMENTS

| | | | |
|---|---|---|---|
| CN | 203569440 U | 4/2014 | |
| CN | 204417974 U | 6/2015 | |
| WO | 2017188884 A1 | 11/2017 | |

OTHER PUBLICATIONS

Extended European Search Report dated Sep. 24, 2021 for European Patent Application No. 18909735.5, 5 pages.

Chinese First Office Action mailed Jun. 17, 2021 for Chinese Patent Application No. 201880091232.9, 10 pages (including English translation).

* cited by examiner

FAN FOR LUBRICATION AND COOLING OF ECCENTRIC BEARINGS IN A SURFACE COMPACTOR MACHINE

CROSS REFERENCE TO RELATED APPLICATIONS

This application is a 35 U.S.C. § 371 national stage application of PCT International Application No. PCT/US2018/022651 filed on Mar. 15, 2018, the disclosure and content of which is incorporated by reference herein in its entirety.

FIELD

The present invention relates to fans, and more particularly to fans for lubrication and cooling of eccentric bearings in a surface compactor machine.

BACKGROUND

Surface compactors are used to compact a variety of substrates including soil, asphalt, or other materials. Surface compactors are provided with one or more compacting surfaces for this purpose. For example, a roller compactor may be provided with one or more cylindrical drums that provide compacting surfaces for compacting substrates.

Roller compactors use the weight of the compactor applied through rolling drums to compress a surface of the substrate being rolled. In addition, one or more of the drums of some roller compactors may be vibrated by a vibration system to induce additional mechanical compaction of the substrate being rolled. The vibration system can include an eccentric shaft assembly that includes one or more eccentric masses that are rotated to generate a vibration force which excites the compacting surface of the drum.

Known roller compactors typically need to rotate the eccentric masses at high rotational speed, e.g., 1000 rpm or more. However, factors that limit the rotational speed of the eccentric masses include a need to provide adequate lubrication and cooling to bearings within the eccentric shaft assembly. Failing to adequately lubricate and cool these and other components of the vibration system can reduce the useful life of those components and can also lead to damage to the eccentric shaft assembly.

SUMMARY

One embodiment of the invention is directed to an eccentric shaft assembly. The eccentric shaft assembly comprises a first eccentric shaft having an axis of rotation and a center of mass that is radially offset from the axis of rotation. The first eccentric shaft comprises an interior surface forming a recess therein and an exterior surface. The first eccentric shaft further comprises at least one first fluid inlet extending between the interior surface and the exterior surface, at least one first fluid outlet extending between the interior surface and the exterior surface, and a first bearing surface between the at least one first fluid inlet and the at least one first fluid outlet. The eccentric shaft assembly further comprises a first bearing subassembly engaging the first bearing surface. The eccentric shaft assembly further comprises a second eccentric shaft disposed in the recess of the first eccentric shaft. The second eccentric shaft has the axis of rotation, a center of mass that is radially offset from the axis of rotation, a second bearing surface engaging the first bearing subassembly opposite the first bearing surface, and at least one first fan blade for rotating about the axis of rotation to force a fluid to enter the recess through the at least one first fluid inlet and exit the recess through the at least one first fluid outlet.

Another embodiment of the invention is directed to a method of operating an eccentric shaft assembly. The method comprises providing a first eccentric shaft having an axis of rotation and a center of mass that is radially offset from the axis of rotation, the first eccentric shaft forming a recess therein. The method further comprises rotating a second eccentric shaft disposed in the recess of the first eccentric shaft with respect to the first eccentric shaft about the axis of rotation, the second eccentric shaft a center of mass that is radially offset from the axis of rotation, the second eccentric shaft comprising at least one first fan blade. Rotating the second eccentric shaft causes the at least one first fan blade to rotate to force a fluid to enter the recess through at least one first fluid inlet formed in the first eccentric shaft, flow past a first bearing subassembly disposed in the recess between the first eccentric shaft and the second eccentric shaft and exit the recess through the at least one first fluid outlet formed in the first eccentric shaft.

Another embodiment of the invention is directed to an eccentric shaft assembly. The eccentric shaft assembly comprises a first shaft. The first shaft comprises an interior surface forming a recess therein, and an exterior surface. The first shaft further comprises at least one first fluid inlet extending between the interior surface and the exterior surface, at least one first fluid outlet extending between the interior surface and the exterior surface, and a first bearing surface between the at least one first fluid inlet and the at least one first fluid outlet. The eccentric shaft assembly further comprises a first bearing subassembly engaging the first bearing surface. The eccentric shaft assembly further comprises a second shaft disposed in the recess of the first eccentric shaft. The second shaft has the axis of rotation, a center of mass that is radially offset from the axis of rotation, a second bearing surface engaging the first bearing subassembly opposite the first bearing surface, and at least one first fan blade integrally formed with the second shaft for rotating about the axis of rotation to force a fluid to enter the recess through the at least one first fluid inlet and exit the recess through the at least one first fluid outlet.

Other surface compactor machines, methods, and control systems according to embodiments will be or become apparent to one with skill in the art upon review of the following drawings and detailed description. It is intended that all such additional surface compactor machines, methods, and control systems be included within this description and protected by the accompanying claims. Moreover, it is intended that all embodiments disclosed herein can be implemented separately or combined in any way and/or combination

ASPECTS

According to some aspects an eccentric shaft assembly comprises a first eccentric shaft having an axis of rotation and a center of mass that is radially offset from the axis of rotation. The first eccentric shaft comprises an interior surface forming a recess therein. The first eccentric shaft further comprises an exterior surface. The first eccentric shaft further comprises at least one first fluid inlet extending between the interior surface and the exterior surface. The first eccentric shaft further comprises at least one first fluid outlet extending between the interior surface and the exterior surface. The interior surface of the first eccentric shaft comprises first bearing surface between the at least one first fluid inlet and the at least one first fluid outlet. The eccentric shaft assembly further comprises a first bearing subassembly engaging the first bearing surface. The eccentric shaft assembly further comprises a second eccentric shaft disposed in the recess of the first eccentric shaft. The second eccentric shaft has the axis of rotation and a center of mass that is radially offset from the axis of rotation. The second eccentric shaft comprises a second bearing surface engaging the first bearing subassembly opposite the first bearing surface. The second eccentric shaft further comprises at least one first fan blade for rotating about the axis of rotation to force a fluid to enter the recess through the at least one first fluid inlet and exit the recess through the at least one first fluid outlet.

According to another aspect, the at least one first fluid outlet comprises a plurality of first fluid outlets disposed radially around the first eccentric shaft.

According to another aspect, each of the plurality of first fluid outlets extends along a radial outlet axis that intersects the axis of rotation of the first eccentric shaft.

According to another aspect, the at least one first fan blade is integrally formed with the second eccentric shaft.

According to another aspect, the at least one first fan blade comprises a plurality of first fan blades disposed radially around the second eccentric shaft.

According to another aspect, each of the plurality of first fan blades extends radially outwardly from the axis of rotation.

According to another aspect, the at least one first fan blade is located between the first bearing subassembly and the at least one first fluid outlet of the first eccentric shaft.

According to another aspect, the first eccentric shaft further comprises at least one second fluid inlet extending between the interior surface and the exterior surface, and at least one second fluid outlet extending between the interior surface and the exterior surface. The interior surface of the first eccentric shaft further comprises a third bearing surface between the at least one second fluid inlet and the at least one second fluid outlet. The eccentric shaft assembly further comprises a second bearing subassembly engaging the third bearing surface. The second eccentric shaft further comprises a fourth bearing surface engaging the second bearing subassembly opposite the third bearing surface, and at least one second fan blade for rotating about the axis of rotation to force the fluid to enter the recess through the at least one second fluid inlet and exit the recess through the at least one second fluid outlet.

According to another aspect, the center of mass of the first eccentric shaft is between the first bearing surface and the third bearing surface. The center of mass of the second eccentric shaft is between the second bearing surface and the fourth bearing surface.

According to another aspect, the eccentric shaft assembly further comprises an oil sump forming an enclosure around the first eccentric shaft and the second eccentric shaft. The eccentric shaft assembly further comprises at least one oil slinger coupled to the first eccentric shaft for circulating the fluid within the enclosure proximate to the at least one first fluid inlet of the first eccentric shaft.

According to another aspect, the at least one first fluid outlet of the first eccentric shaft is disposed between the at least one first fluid inlet and the center of mass of the first eccentric shaft. The at least one first fan blade of the second eccentric shaft is disposed between the at least one first fluid inlet of the first eccentric shaft and the center of mass of the second eccentric shaft.

According to another aspect, rotation of the at least one first fan blade of the second eccentric shaft generates a decrease in pressure at the at least one first fluid inlet of the first eccentric shaft and the first bearing subassembly to force the fluid into the recess through the at least one inlet past the at least one first bearing subassembly, and toward the at least one first fan blade.

According to another aspect, rotation of the at least one first fan blade of the second eccentric shaft generates an increase in pressure at the at least one first fluid outlet of the first eccentric shaft to force the fluid out of the recess through the at least one first fluid outlet and away from the at least one first fan blade.

According to another aspect, the at least one first fan blade is configured to force a fluid comprising at least one of air or a lubricant to enter the recess through the at least one first fluid inlet and exit the recess through the at least one first fluid outlet.

According to another aspect, the at least one first fan blade is configured to force a fluid comprising a mixture of air and a lubricant through the at least one first fluid inlet and exit the recess through the at least one first fluid outlet.

According to some other aspects, a method of operating an eccentric shaft assembly comprises providing a first eccentric shaft having an axis of rotation and a center of mass that is radially offset from the axis of rotation, the first eccentric shaft forming a recess therein. The method further comprises rotating a second eccentric shaft disposed in the recess of the first eccentric shaft with respect to the first eccentric shaft about the axis of rotation, the second eccentric shaft a center of mass that is radially offset from the axis of rotation, the second eccentric shaft comprising at least one first fan blade. Rotating the second eccentric shaft causes the at least one first fan blade to rotate to force a fluid to enter the recess through at least one first fluid inlet formed in the first eccentric shaft, flow past a first bearing subassembly disposed in the recess between the first eccentric shaft and the second eccentric shaft and exit the recess through the at least one first fluid outlet formed in the first eccentric shaft.

According to another aspect, rotating the second eccentric shaft causes the at least one first fan blade to rotate to force a fluid to exit the recess through a plurality of first fluid outlets disposed radially around the first eccentric shaft.

According to another aspect, the at least one first fan blade is integrally formed with the second eccentric shaft.

According to another aspect, the at least one first fan blade comprises a plurality of first fan blades disposed radially around the second eccentric shaft.

According to some other aspects, an eccentric shaft assembly comprises a first shaft. The first shaft comprises an interior surface forming a recess therein. The first shaft further comprises an exterior surface. The first shaft further comprises at least one first fluid inlet extending between the interior surface and the exterior surface. The first shaft further comprises at least one first fluid outlet extending between the interior surface and the exterior surface. The interior surface of the first shaft comprises a first bearing surface between the at least one first fluid inlet and the at least one first fluid outlet. The eccentric shaft assembly further comprises a first bearing subassembly engaging the first bearing surface. The eccentric shaft assembly further comprises a second shaft disposed in the recess of the first eccentric shaft. The second shaft having the axis of rotation and a center of mass that is radially offset from the axis of rotation. The second shaft comprises a second bearing surface engaging the first bearing subassembly opposite the first bearing surface. The second shaft further comprises at least one first fan blade integrally formed with the second shaft for rotating about the axis of rotation to force a fluid to enter the recess through the at least one first fluid inlet and exit the recess through the at least one first fluid outlet.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION OF EMBODIMENTS

The present invention relates to fans, and more particularly to fans for lubrication and cooling of eccentric bearings in a surface compactor machine. In some embodiments, a first eccentric shaft has an axis of rotation and a center of mass that is radially offset from the axis of rotation. The first eccentric shaft forms a recess therein, and a second eccentric shaft having the same axis of rotation and a center of mass that is radially offset from the axis of rotation is disposed within the recess. At least one bearing subassembly is disposed between the first eccentric shaft and the second eccentric shaft to support the second eccentric shaft within the recess and to allow the first eccentric shaft and second eccentric shaft to rotate independently of each other. The first eccentric shaft has at least one fluid inlet extending between an interior surface and the exterior surface of the first eccentric shaft and at least one fluid outlet extending between the interior surface and the exterior surface. The bearing subassembly(s) are disposed between fluid inlet(s) and the fluid outlet(s). The second eccentric shaft further includes at least one fan blade for rotating about the axis of rotation to force a fluid to enter the recess through the first fluid inlet(s) and exit the recess through the first fluid outlet(s), thereby facilitating lubrication and/or cooling of the bearing subassembly(s) and other components within the recess.

One advantage of this arrangement is that circulation of the fluid within the recess is increased, thereby improving lubrication and/or cooling of the components therein and extending the useful life of those components. Rotation of fan blade(s) generates a pressure differential within the recess which forces the fluid into the recess through the inlet(s) of the first eccentric shaft and the out of the recess through the outlet(s) of the first eccentric shaft. The forced flow path created by the pressure differential forces in increase in flow of the fluid through the recess, which brings a larger amount of the fluid into contact with bearing subassembly(s) and other components within the recess as the fluid circulates through the recess, thereby improving the lubrication and/or cooling of the components within the recess during operation of the eccentric shaft assembly.

Figure 1:
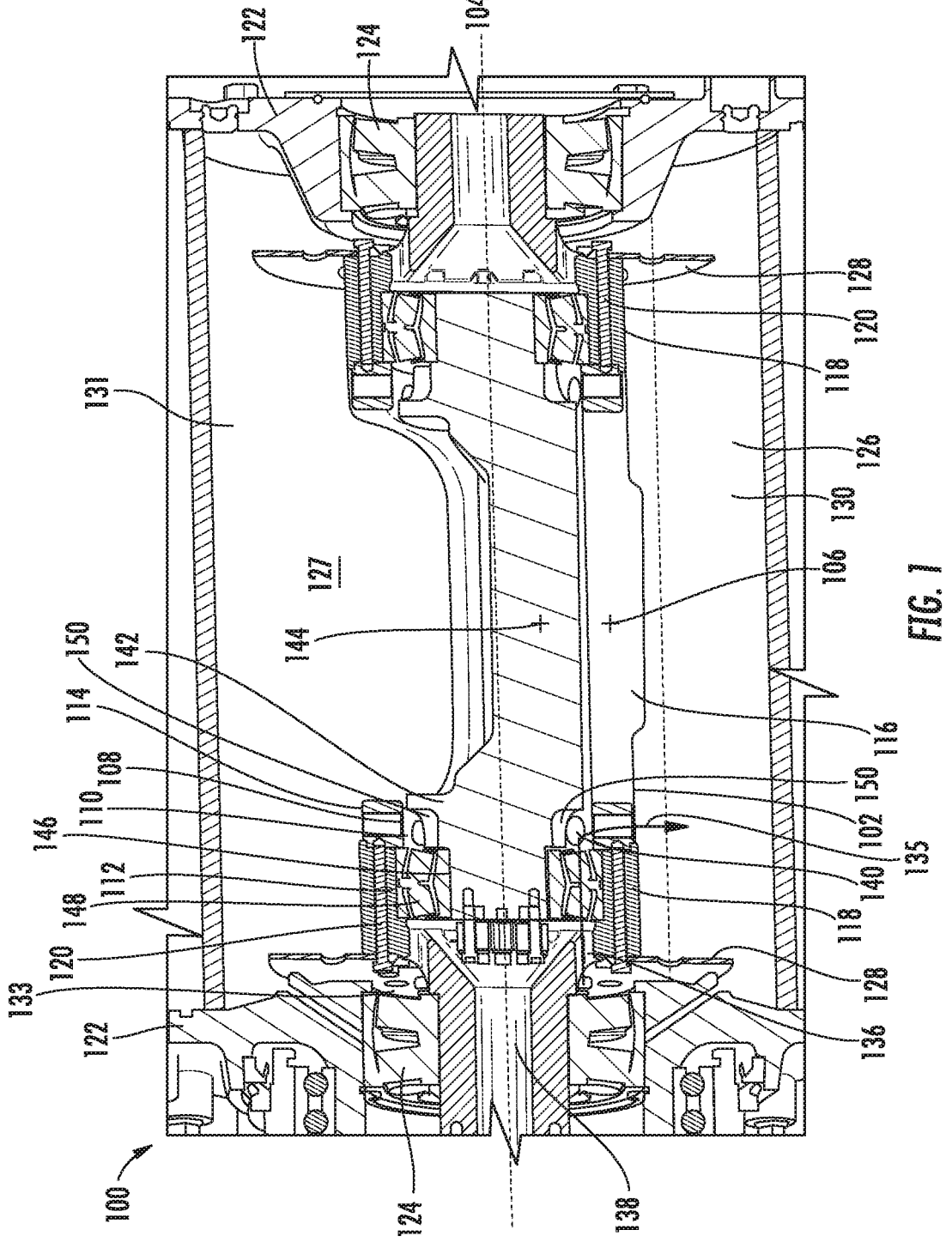
FIG. 1 a cross-sectional view of an eccentric shaft assembly having a fan for facilitating lubrication and cooling of the eccentric shaft assembly, according to an embodiment.

Referring now to FIG. 1, a cross-sectional view of an eccentric shaft assembly 100 is illustrated, according to an embodiment. The eccentric shaft assembly includes a first eccentric shaft 102 having a first axis of rotation 104 and a center of mass 106 that is radially offset from the axis of rotation 104 such that rotating the first eccentric shaft 102 produces a vibration corresponding to the rotational speed of the first eccentric shaft 102. The first eccentric shaft 102 has an interior surface 108, forming a recess 110 and a pair of internal bearing surfaces 112 therein, and an exterior surface 114. In this example, the first eccentric shaft 102 comprises an eccentric mass 116 coupled between a pair of journals 118 by a plurality of fasteners 120 (e.g. bolts in this example). The journals 118 are supported within a pair of housings 122 via a pair of outer bearing subassemblies 124, and an oil sump 126 forms an enclosure around the first eccentric shaft 102. In this example, a pair of oil slingers 128 are coupled to the journals 118 and contact a reservoir of lubricating fluid 130 (such as oil, for example) stored within the enclosure of the oil sump 126. As the first eccentric shaft 102 rotates, the oil slingers 128 also rotate to circulate the lubricating fluid 130 in the air 131 or other fluid occupying the remaining volume of the enclosure 127, to facilitate lubrication and/or cooling of components within the enclosure 127.

The first eccentric shaft 102 further includes a plurality of passageways extending between the interior surface 108 and the exterior surface 114 of the first eccentric shaft 102 to form one or more fluid flow paths 135 into and out of the recess 110 of the first eccentric shaft 102. In this example, each journal 118 of the first eccentric shaft 102 has a plurality of longitudinal inlets 136 disposed around a central shaft inlet 138 and the eccentric mass 116 of the first eccentric shaft 102 has a plurality of radial outlets 140 disposed at opposite ends of the eccentric mass 116 proximate to each journal 118.

A second eccentric shaft 142 is disposed within the recess 110 of the first eccentric shaft 102. The second eccentric shaft 142 is configured to rotate about the same axis of rotation 104 as the first eccentric shaft 102, and the second eccentric shaft 142 has a center of mass 144 radially offset from the axis of rotation 104 such that rotating the second eccentric shaft 142 produces a vibration corresponding to the rotational speed of the second eccentric shaft 142. The second eccentric shaft 142 can be configured to rotate independently of the first eccentric shaft 102, which allows the first eccentric shaft 102 and/or the second eccentric shaft 142 can each rotate in different directions and/or at different speeds with respect to each other.

A pair of inner bearing subassemblies 148 are disposed between the respective pairs of internal bearing surfaces 112 of the first eccentric shaft 102 and the outer bearing surfaces 146 of the second eccentric shaft 142, to support the second eccentric shaft 142 within the recess 110 of the first eccentric shaft 102 and to allow the first eccentric shaft 102 and/or the second eccentric shaft 142 to rotate independently of each other. A plurality of fan blades 150 are disposed radially around the second eccentric shaft 142 between each inner bearing subassembly 148 and the center of mass 144 of the second eccentric shaft 142, opposite the radial outlets formed in the first eccentric shaft 102. In this example, each of the plurality of fan blades 150 extends radially outwardly from the axis of rotation 104 such that rotation of the fan blades 150 in either rotational direction generates a decrease in pressure at the corresponding longitudinal inlets 136 and inner bearing subassembly 148 to force the fluid mixture 133, which is being circulated around the longitudinal inlets 136 by the rotation of the oil slingers 128, through the longitudinal inlets 136 and into the recess 110 of the first eccentric shaft 102. The decreased pressure pulls the fluid mixture 133 past the inner bearing subassemblies 148 toward the fan blades 150, thereby facilitating lubrication and/or cooling of the inner bearing subassemblies 148 and other components within the first eccentric shaft 102. The rotation of the fan blades 150 further generates an increase in pressure at the radial outlets 140 of the first eccentric shaft 102 to force the fluid mixture 133 radially away from the fan blades 150 and out of the recess 110 through the radial outlets 140. In this example, each of the radial outlets 140 extends along a radial outlet axis 154 that intersects the axis of rotation 104 of the first eccentric shaft 102, but it should be understood that the arrangement of radial outlets 140 may be customized into a number of different configurations, as desired. Similarly, it should be understood that the arrangement of fan blades 150 may also be customized into a number of different configurations, as desired.

Figure 2:
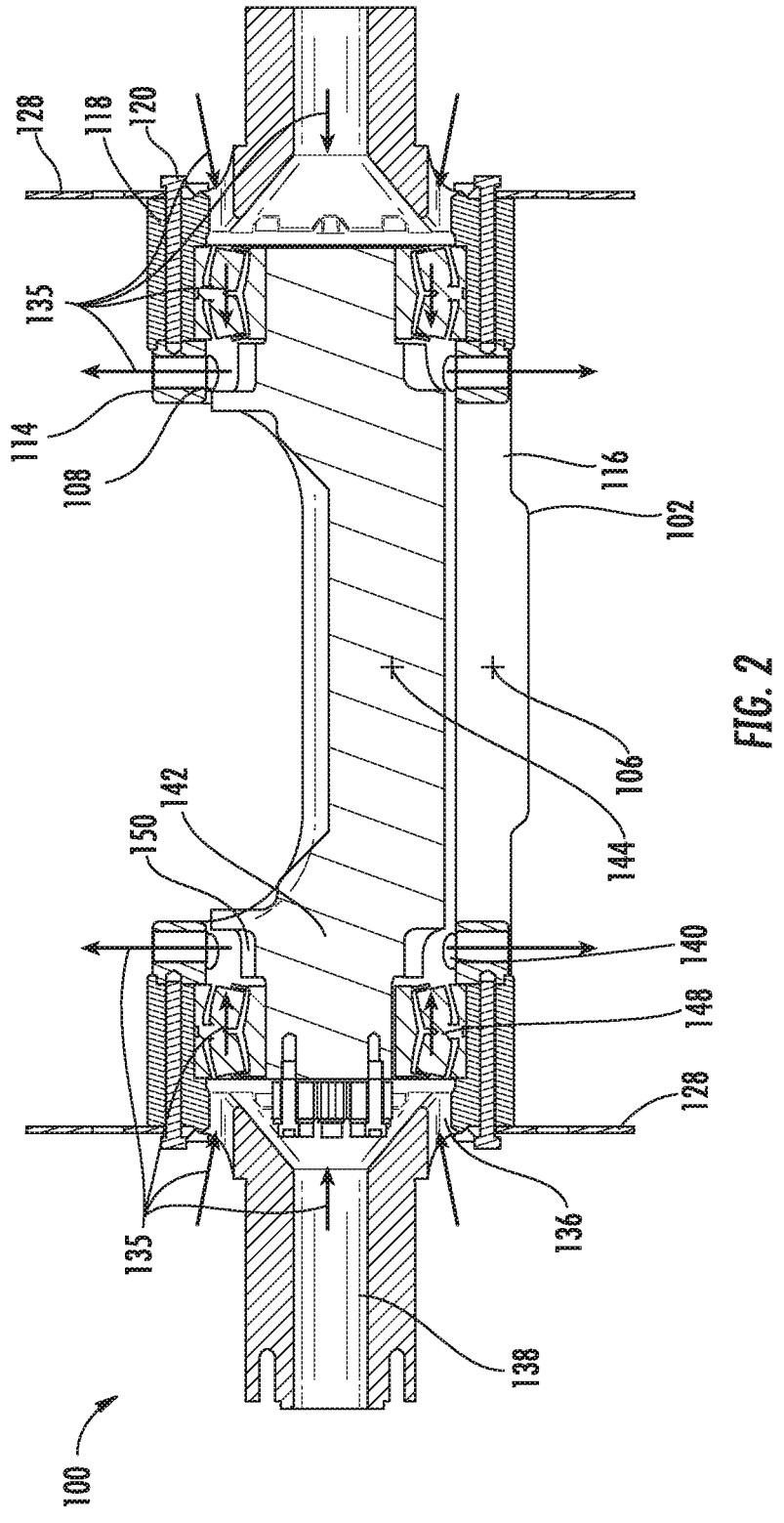
FIG. 2 illustrates a cross-sectional view of the eccentric shaft assembly of FIG. 1 showing additional details of the flow paths around the bearing subassemblies, according to an embodiment.

Referring now to FIG. 2, a cross-sectional view of the eccentric shaft assembly 100 of FIG. 1 showing additional details of the fluid flow paths 135 around the inner bearing subassemblies 148 is illustrated, according to an embodiment. In this example, the first eccentric shaft 102 and second eccentric shafts 142 can rotate independently of each other, at different speeds. As the second eccentric shaft 142 rotates, the fan blades 150 at either end generate a decrease in pressure at the respective longitudinal inlets 136 and/or the central shaft inlet 138 and at the respective inner bearing subassembly 148. The decrease in pressure forces a fluid (e.g., the lubricating fluid 130, air 131 and/or fluid mixture 133 of FIG. 1 for example) into the recess 110, and toward the respective fan blades 150. The rotation of the fan blades 150 also generates an increase in pressure at the respective radial outlets 140 of the first eccentric shaft 102. The pressure increase forces the fluid out of the recess 110 through the radial outlets 140 and away from the respective fan blades 150. In this manner, rotation of the second eccentric shaft 142 continuously circulates fluid through the recess 110 to cool and/or lubricate the internal components of the eccentric shaft assembly 100, including the inner bearing subassemblies 148.

Figure 3:
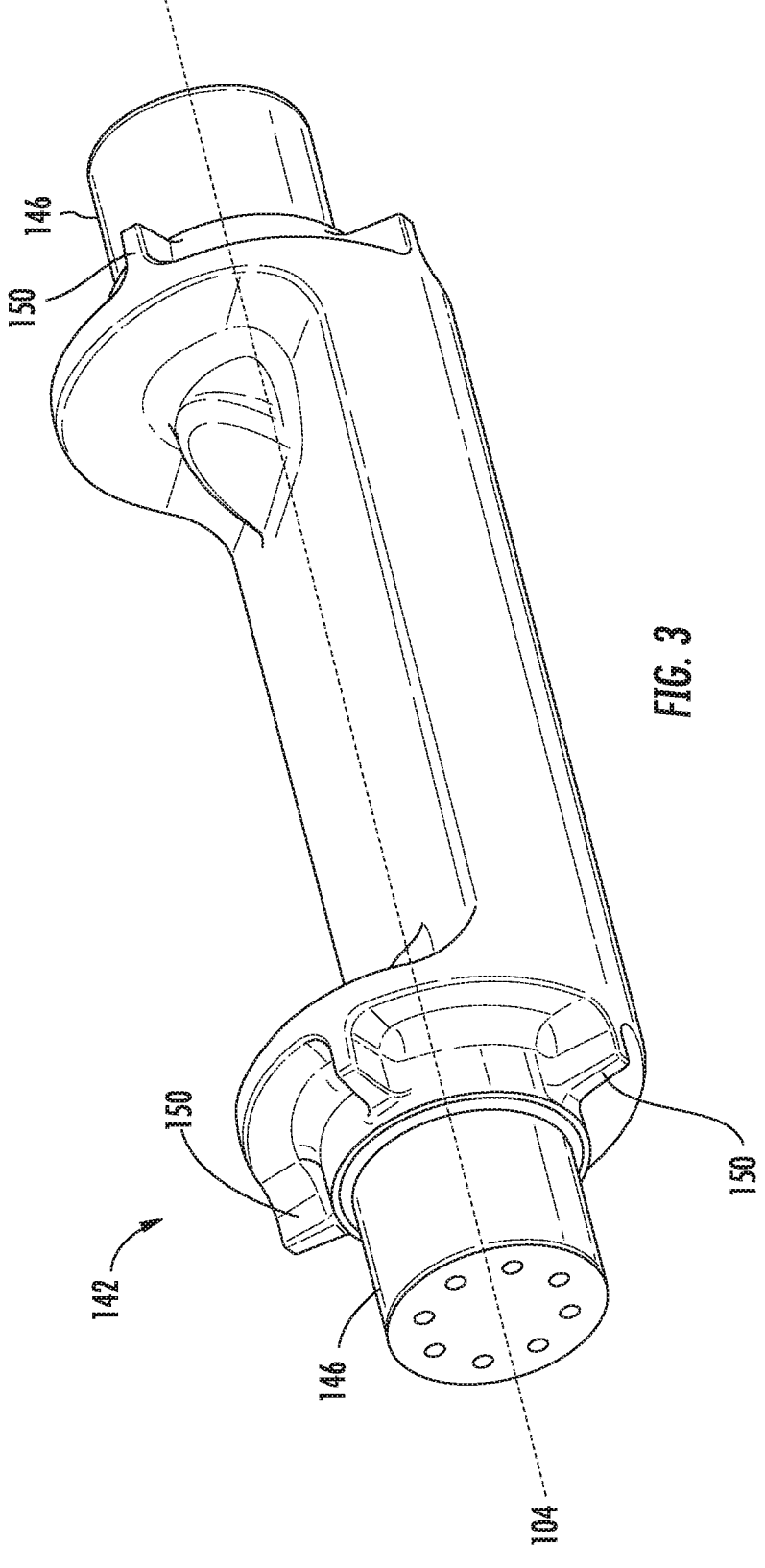
FIG. 3 illustrates a isometric view of the second eccentric shaft of FIGS. 1 and 2, illustrating details of the fan blades, according to an embodiment.

FIG. 3 illustrates a isometric view of the second eccentric shaft 142 of FIGS. 1 and 2, illustrating details of the fan blades 150, according to an embodiment. In this example, each of the fan blades 150 is integrally formed with the second eccentric shaft 142. The fan blades 150 are arranged radially around the second eccentric shaft 142, with each fan blade extending radially outwardly from the axis of rotation 104 of the second eccentric shaft 142.

Figure 4:
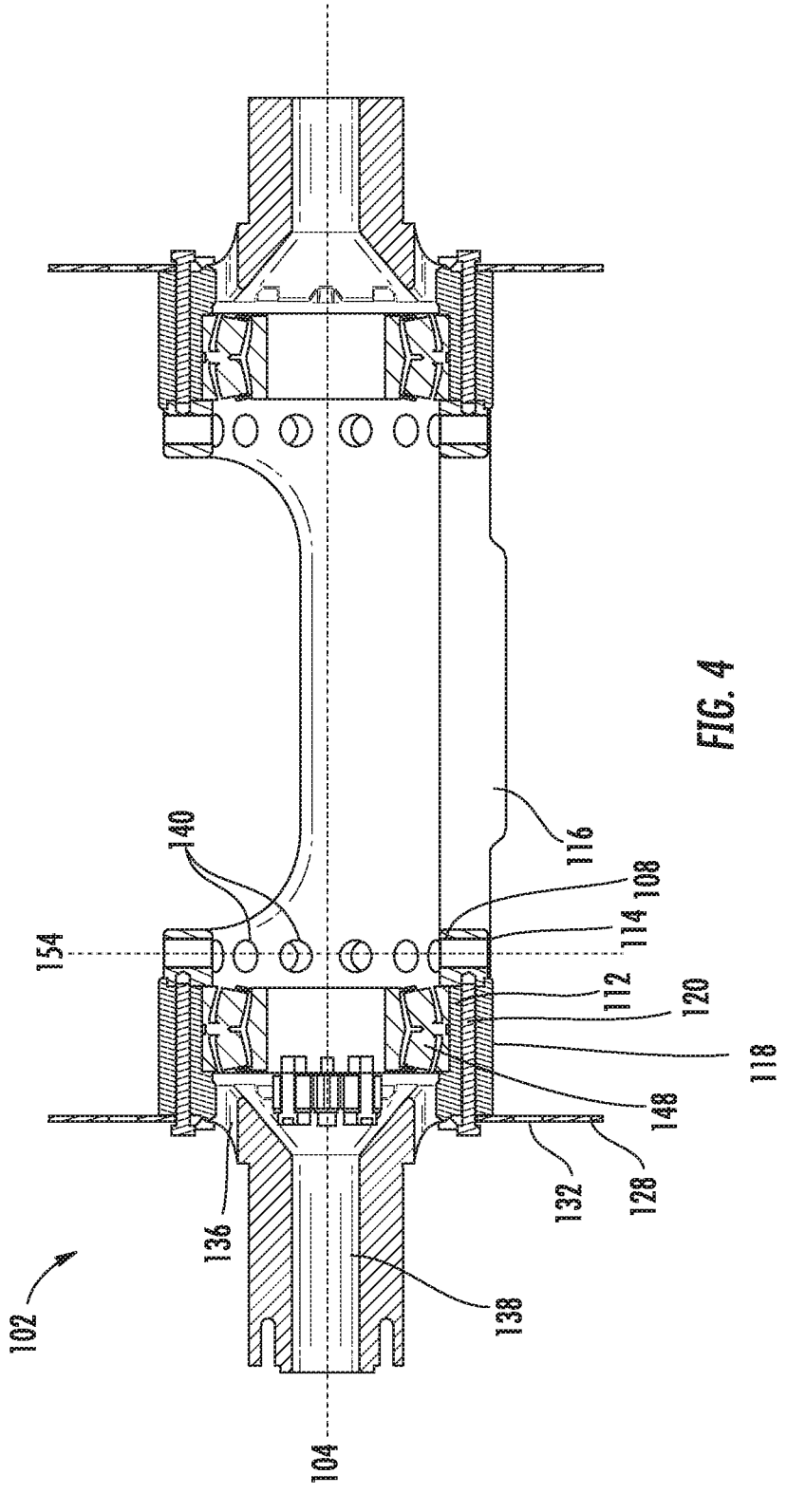
FIG. 4 illustrates a cross sectional view of the first eccentric shaft of FIGS. 1 and 2, illustrating details of the passageways, according to an embodiment.

FIG. 4 illustrates a cross sectional view of the first eccentric shaft 102 of FIGS. 1 and 2, illustrating details of the radial outlets 140, according to an embodiment. In this example, each of the plurality of radial outlets 140 extends along a radial outlet axis 154 that intersects the axis of rotation 104 of the first eccentric shaft. In this example, the fan blades 150 of the second eccentric shaft 142 if FIG. 3 are substantially aligned with the radial outlets 140 so that rotation of the fan blades 150 forces the fluid directly and efficiently out of the radial outlets 140. It should be understood, however, that different configurations defining different flow paths for the fluid may be used as desired.

Figure 5:
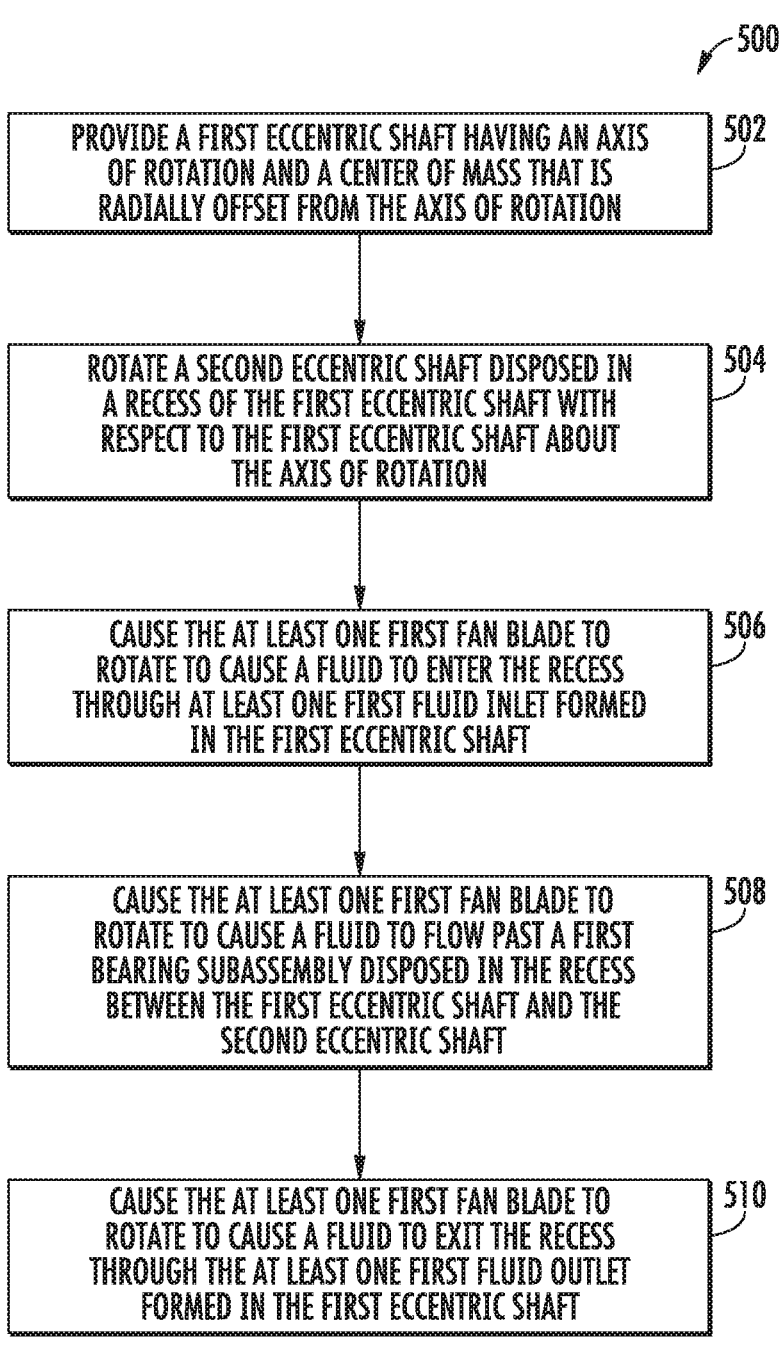
FIG. 5 illustrates a flowchart for a method of operating an eccentric shaft assembly, such as the eccentric shaft assembly of FIGS. 1 and 2, according to an embodiment.

FIG. 5 illustrates a flowchart for a method 500 of operating an eccentric shaft assembly, such as the eccentric shaft assembly of FIGS. 1 and 2, for example. The method 500 includes providing a first eccentric shaft having an axis of rotation and a center of mass that is radially offset from the axis of rotation, the first eccentric shaft forming a recess therein (Block 502). The method also includes rotating a second eccentric shaft disposed in the recess of the first eccentric shaft with respect to the first eccentric shaft about the axis of rotation (Block 504). The second eccentric shaft has a center of mass that is radially offset from the axis of rotation and includes at least one first fan blade. Rotating the second eccentric shaft causes the first fan blade(s) to rotate to force a fluid to enter the recess through at least one first fluid inlet formed in the first eccentric shaft (Block 506), flow past a first bearing subassembly disposed in the recess between the first eccentric shaft and the second eccentric shaft (Block 508), and exit the recess through the first fluid outlet(s) formed in the first eccentric shaft (Block 510).

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/ operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. An eccentric shaft assembly comprising:
a first eccentric shaft having an axis of rotation and a center of mass that is radially offset from the axis of rotation, the first eccentric shaft comprising:
an interior surface forming a recess therein;
an exterior surface;
at least one first fluid inlet extending between the interior surface and the exterior surface; and
at least one first fluid outlet extending between the interior surface and the exterior surface, wherein the interior surface of the first eccentric shaft comprises a first bearing surface between the at least one first fluid inlet and the at least one first fluid outlet;
a first bearing subassembly engaging the first bearing surface;
a second eccentric shaft disposed in the recess of the first eccentric shaft, the second eccentric shaft having the axis of rotation and a center of mass that is radially offset from the axis of rotation, the second eccentric shaft comprising:
a second bearing surface engaging the first bearing subassembly opposite the first bearing surface; and
at least one first fan blade for rotating about the axis of rotation to force a fluid to enter the recess through the at least one first fluid inlet and exit the recess through the at least one first fluid outlet, wherein the at least one first fan blade is integrally formed with the second eccentric shaft.

2. The eccentric shaft assembly of claim 1, wherein the at least one first fluid outlet comprises a plurality of first fluid outlets disposed radially around the first eccentric shaft.

3. The eccentric shaft assembly of claim 2, wherein each of the plurality of first fluid outlets extends along a radial outlet axis that intersects the axis of rotation of the first eccentric shaft.

4. The eccentric shaft assembly of claim 1, wherein the at least one first fan blade comprises a plurality of first fan blades disposed radially around the second eccentric shaft.

5. The eccentric shaft assembly of claim 4, wherein each of the plurality of first fan blades extends radially outwardly from the axis of rotation.

6. The eccentric shaft assembly of claim 1, wherein the at least one first fan blade is located between the first bearing subassembly and the at least one first fluid outlet of the first eccentric shaft.

7. The eccentric shaft assembly of claim 1, wherein the first eccentric shaft further comprises:
at least one second fluid inlet extending between the interior surface and the exterior surface; and
at least one second fluid outlet extending between the interior surface and the exterior surface, wherein the interior surface of the first eccentric shaft further comprises a third bearing surface between the at least one second fluid inlet and the at least one second fluid outlet,
wherein the eccentric shaft assembly further comprises a second bearing subassembly engaging the third bearing surface, and wherein the second eccentric shaft further comprises:
a fourth bearing surface engaging the second bearing subassembly opposite the third bearing surface; and
at least one second fan blade for rotating about the axis of rotation to force the fluid to enter the recess through the at least one second fluid inlet and exit the recess through the at least one second fluid outlet.

8. The eccentric shaft assembly of claim 7, wherein the center of mass of the first eccentric shaft is between the first bearing surface and the third bearing surface, and
wherein the center of mass of the second eccentric shaft is between the second bearing surface and the fourth bearing surface.

9. The eccentric shaft assembly of claim 1, further comprising:
an oil sump forming an enclosure around the first eccentric shaft and the second eccentric shaft; and
at least one oil slinger coupled to the first eccentric shaft for circulating the fluid within the enclosure proximate to the at least one first fluid inlet of the first eccentric shaft.

10. The eccentric shaft assembly of claim 1, wherein the at least one first fluid outlet of the first eccentric shaft is disposed between the at least one first fluid inlet and the center of mass of the first eccentric shaft, and
wherein the at least one first fan blade of the second eccentric shaft is disposed between the at least one first fluid inlet of the first eccentric shaft and the center of mass of the second eccentric shaft.

11. The eccentric shaft assembly of claim 1, wherein rotation of the at least one first fan blade of the second eccentric shaft generates a decrease in pressure at the at least one first fluid inlet of the first eccentric shaft and the first bearing subassembly to force the fluid into the recess through the at least one first fluid inlet past the first bearing subassembly, and toward the at least one first fan blade.

12. The eccentric shaft assembly of claim 11, wherein rotation of the at least one first fan blade of the second eccentric shaft generates an increase in pressure at the at least one first fluid outlet of the first eccentric shaft to force the fluid out of the recess through the at least one first fluid outlet and away from the at least one first fan blade.

13. The eccentric shaft assembly of claim 1, wherein the at least one first fan blade is configured to force a fluid comprising at least one of air or a lubricant to enter the recess through the at least one first fluid inlet and exit the recess through the at least one first fluid outlet.

14. The eccentric shaft assembly of claim 1, wherein the at least one first fan blade is configured to force a fluid comprising a mixture of air and a lubricant through the at least one first fluid inlet and exit the recess through the at least one first fluid outlet.

15. An eccentric shaft assembly comprising:
a first shaft comprising:
an interior surface forming a recess therein;
an exterior surface;
at least one first fluid inlet extending between the interior surface and the exterior surface; and
at least one first fluid outlet extending between the interior surface and the exterior surface, wherein the interior surface of the first shaft comprises a first bearing surface between the at least one first fluid inlet and the at least one first fluid outlet;
a first bearing subassembly engaging the first bearing surface;

a second shaft disposed in the recess of the first shaft, the
    second shaft having an axis of rotation and a center of
    mass that is radially offset from the axis of rotation, the
    second shaft comprising:
    a second bearing surface engaging the first bearing
        subassembly opposite the first bearing surface; and
    at least one first fan blade integrally formed with the
        second shaft for rotating about the axis of rotation to
        force a fluid to enter the recess through the at least
        one first fluid inlet and exit the recess through the at
        least one first fluid outlet.

* * * * *